Dec. 2, 1924.
W. SCHOLZ
1,517,256
ATTACHMENT FOR PICKER STICKS
Filed Oct. 4, 1921
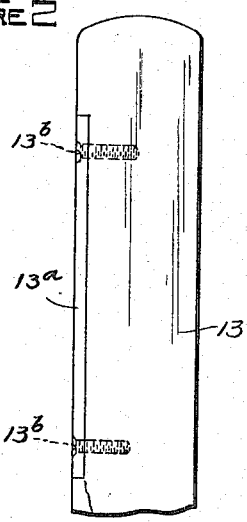
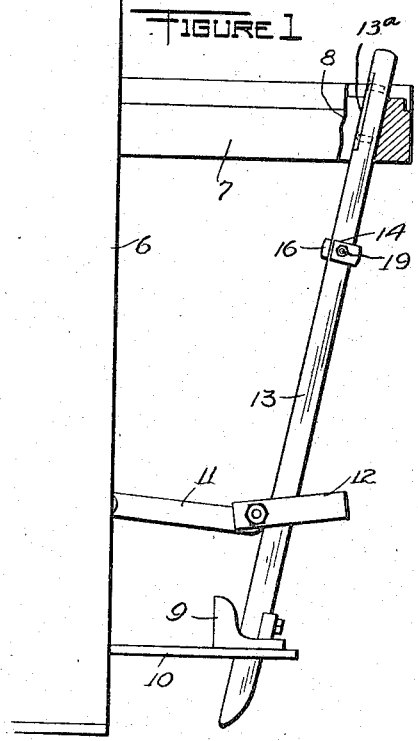
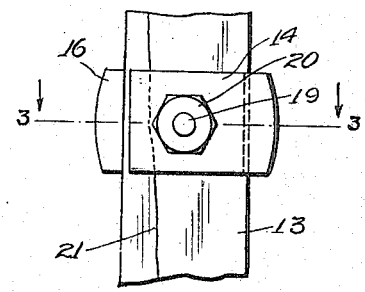
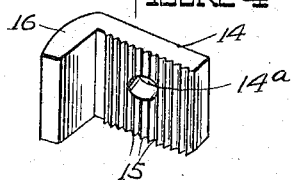
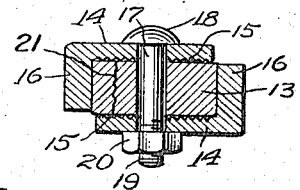
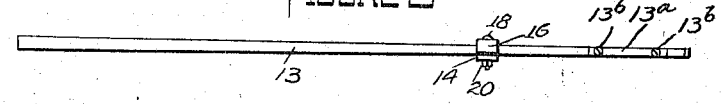
WITNESS
M. E. Lessin
INVENTOR
William Scholz
BY Walton Harrison,
ATTORNEY Patented Dec. 2, 1924.

1,517,256

UNITED STATES PATENT OFFICE.

WILLIAM SCHOLZ, OF CLIFTON, NEW JERSEY.

ATTACHMENT FOR PICKER STICKS.

Application filed October 4, 1921. Serial No. 505,289.

*To all whom it may concern:*

Be it known that I, WILLIAM SCHOLZ, a citizen of the United States, residing in Clifton, in the county of Passaic and State of New Jersey, have invented certain new and useful Improvements in Attachments for Picker Sticks, of which the following is a full, clear, and concise description.

My invention relates to picker stick attachments, my more particular purpose being to strengthen picker sticks of the kind commonly used in weaving machines and looms, for the purpose of actuating the shuttle in one direction of its travel.

Stated more in detail, my invention comprehends an attachment to be applied to and carried by the picker stick, for the purpose of conserving the strength of the picker stick, in order to diminish the chances for the picker stick splitting or to increase its strength if it happens to be already split.

By my invention I seek to produce an attachment consisting of a pair of metallic members, preferably of cast iron, or cast steel, and having such form that they may be readily placed upon or removed from the picker stick, and while in position upon it, practically gripping it upon both faces and both edges, so as to hold it firmly.

I also seek to give such form to the metallic members just mentioned as to render them light in weight and cheap in cost of manufacture, and to render them easy of standardization.

Reference is made to the accompanying drawing forming a part of this specification, and in which like reference characters indicate like parts throughout all of the figures.

Figure 1 is side view, showing my attachment as used upon a picker stick and parts immediately associated therewith, the mechanism being shown partly in elevation and partly in section.

Figure 2 is a fragmentary elevation of the picker stick and my attachment as applied thereto.

Figure 3 is a section on the line 3—3 of Figure 2, looking in the direction indicated by the arrows.

Figure 4 is a perspective of one of the two gripping members of my attachment.

Figure 5 is an edge view of the picker stick and my attachment as applied thereto.

A loom or weaving machine 6 is provided with an extending portion 7, the latter having a slot 8 serving as a shuttle-way. A bearing 9 is carried by a support 10 and located beneath the extending portion 7. An actuating link 11 is pivotally connected with a clamp 12, carried by the picker stick 13. By means of the actuating link 11, the picker stick 13 rocks back and forth in the usual or any desired manner. In this instance the picker stick 13 carries a wearing strip 13$^a$, sunken into the edge of the picker stick and held in position by screws 13$^b$. The picker stick is made of wood, preferably tough ash, the wearing strip 13$^a$ being preferably of fibre. The purpose of the wearing strip is to avoid undue wear of the picker stick incidental to its engagement with the shuttle.

My attachment comprises a pair of gripping members 14, each provided with a roughened face 15, and with a hole 14$^a$. Each gripping member 14 is further provided with a wing 16 integral with it and extending laterally from it, so that the gripping member with its wing is substantially L-shaped, as may be understood from Figure 4.

A bolt 17, provided with a head 18 and with a threaded portion 19, is thrust through a hole in the picker stick and through the holes 14$^a$ of the gripping members 14. A revoluble nut 20 is fitted upon the threaded portion 19 of the bolt. By turning the nut 20, with the parts in the positions indicated in Figures 2 and 3, the pressure of the gripping members 14 upon the picker stick may be increased or diminished at will.

The picker stick may be split from use, as indicated at 21 in Figure 2, but this does not prevent my attachment from being used upon the picker stick. That is to say, whether the picker stick be perfect, as it may be when new, or whether it be split as indicated at 21, my attachment can in either case be applied to it without difficulty, and by any person of ordinary skill. If the picker stick is not split when my attachment is applied, it is not likely to split while carrying the attachment. If however, the picker stick is split before my attachment is applied, the attachment tends to prevent the split from extending, and also increases the strength of the picker stick as a whole.

It sometimes happens that a picker stick becomes from long use more or less shivered, that is, weakened structurally throughout, but without showing any outward indication or splitting or breaking.

In such event the application of my attachment to the picker stick tends to prolong the lifetime of the latter and to conserve its period of usefulness.

The operation of my device may be understood from the foregoing description.

In order to apply the attachment, a hole is bored through the picker stick, the two gripping members 14 are fitted upon opposite sides of the picker stick, the bolt 19 is thrust through both of the gripping members 14 and the picker stick, the nut 20 is fitted upon the bolt and turned, so that the gripping members are thus forced into firm engagement with the surface of the picker stick. This done the picker stick is operated in the usual manner.

When a picker stick equipped with my attachment as above described is worn out or is from any cause discarded, the attachment is removed from it and transferred to some other picker stick, which may be new or old, damaged or undamaged. A good practice is to apply the attachment to the picker stick when the latter is new, and then when the picker stick is worn out to remove the attachment and place it upon a new picker stick.

I do not limit myself to the precise construction shown, as variations may be made therein within the scope of my invention, which is commensurate with my claim.

Having thus described my invention, what I claim as new and desire to secure by Letters Patent is as follows:

In a device of the character described the combination of a wooden picker stick having a rectangular cross section, a pair of gripping members made of metal and each engaging said picker stick, each gripping member being provided with a rough surface fitted upon one face of the picker stick and further provided with a wing portion extending across one edge of the picker stick so that the two gripping members practically enclose a rectangular portion of the picker stick, the portion thus enclosed extending integrally through the gripping members, and means for forcing said gripping members against said picker stick.

WILLIAM SCHOLZ.